Sept. 16, 1969  S. BAXTER ET AL  3,467,570
EXTRUSION OF RESINS
Filed June 6, 1966
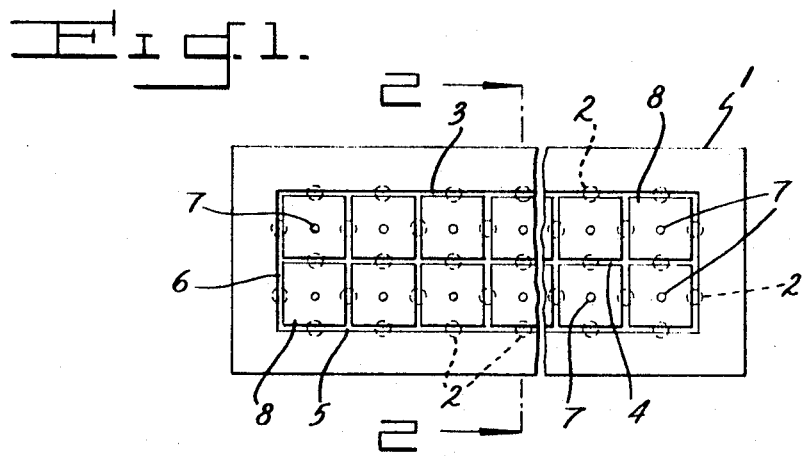
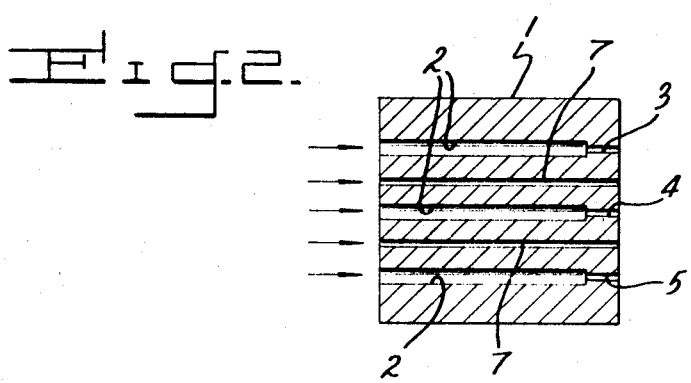
INVENTORS
Samuel Baxter
John H. Gilbert
BY James M. Mason
ATTORNEY United States Patent Office 3,467,570
Patented Sept. 16, 1969

3,467,570
EXTRUSION OF RESINS
Samuel Baxter, Penhow, and John Harold Gilbert, Chepstow, England, assignors to Monsanto Chemicals Limited, London, England, a British company
Filed June 6, 1966, Ser. No. 555,495
Claims priority, application Great Britain, June 24, 1965, 26,765/65
Int. Cl. B32b 3/26, 5/18
U.S. Cl. 161—165                                    15 Claims

ABSTRACT OF THE DISCLOSURE

Dies and processes for extruding a foamable thermoplastic synthetic resin through a plurality of channels and passages extending from the inlet to the outlet end of a die, each of the channels communicating with a network of slits at the outlet end of the die and each of the passages having its outlet substantially in the center of a mesh of the network of slits and not communicating directly with the slits, so that a strand of foamed resin is extruded from each passage and is enveloped by foamed resin issuing from the slits of the network. Foamed articles, e.g., boards, thus formed are characterized by having a substantially uniform cross-section at right angles to the length consisting of a network of extruded foamed material having enclosed within each of the meshes of the network a strand of extruded foamed material.

---

This invention relates to an improved process for the production of a foamed thermoplastic resin by extrusion, as well as to the new foamed material itself and to a new die for the extrusion. The invention is an improvement in or modification of the invention described in U.S. application Serial No. 376,089 filed June 18, 1964 now Patent No. 3,406,230.

U.S. application Serial No. 376,089 describes a process for the production of a foamed thermoplastic synthetic resin by extrusion, which comprises extruding a foamable thermoplastic resin through a die having at its inlet end a plurality of separate channels communicating with a slit at the outlet end of the die, the pressure within the die being sufficient to prevent the resin foaming before it leaves the slit and the relationship between the dimensions of the channels and the dimensions of the slit being such that the streams of resin issuing from the channels spread out to fill the slit and to coalesce whilst still in the unfoamed state. There can be a number of slits arranged in the form of a network, each slit having its associated row of channels.

It has now been found that an improved foamed product, particularly one having a low density, is obtained if a die having a modified network of slits is employed.

The process of the present invention is one for the production of a foamed thermoplastic synthetic resin which comprises extruding a foamable thermoplastic synthetic resin through a die having at its inlet end a plurality of channels communicating with slits arranged to form the meshes of a network as viewed from the outlet end of the die, the majority of the meshes each having a substantially central passage leading back from the front face of the die to a point nearer the inlet end of the die and not communicating directly with the slits, such that a strand of foamed resin is extruded from each passage and is enveloped by foamed resin issuing from the slits of the network. An object of the invention is accordingly a process for the production of an improved foamed thermoplastic synthetic resin by the extrusion of a foamable thermoplastic synthetic resin through a die under a pressure sufficient to prevent foaming, coalescing the foamable thermoplastic synthetic resin while still under pressure, expanding the resulting coalesced mass to form the meshes of a network of the foamed material and at the same time extruding strands of a foamable thermoplastic synthetic resin into the interstices of the network.

The process is of particular application in the production of foamed board, for example of foamed polystyrene, by extrusion. The term board is used to describe flat sheet material of substantial thickness, usually at least ¾ inch and often of a thickness of 1½ to 4 inches, which is useful as an insulating medium in a wide variety of circumstances.

The invention also comprises an extrusion die suitable for use in the extrusion of a foamed thermoplastic resin, which comprises at its inlet end a plurality of channels communicating with slits arranged to form the meshes of a network as viewed from the outlet end of the die, the majority of the meshes each having a substantially central passage leading back from the front face of the die to a point nearer the inlet end of the die and not communicating directly with the slit. When such a die is operated in the extrusion of a foamed thermoplastic resin a strand of foamed resin is extruded from each passage and is enveloped by foamed resin issuing from the slits of the network. Another object of the invention is the provision of an improved extrusion die having foamable thermoplastic resin having a series of separate channels communicating with a network of slits at the outlet end of the die and provided with substantial central passages for delivering individual strands of the foamed thermoplastic resin to the interstices of the slits.

Also included in the invention is a board of the extruded foamed thermoplastic resin itself, particularly for example where it is derived from polystyrene. A board of the invention is one that is an extruded foamed thermoplastic resin having a cross-section at right angles to its length consisting of a network of extruded material having enclosed within each of the meshes of the network a strand of extruded foamed material, such that the board as a whole has a substantially uniform cross-section, the board having a thickness of at least ¾ inch, a density of from 0.9 to 1.5 or 2 pounds per cubic foot, and upper and lower faces which are substantially flat. Another object of the invention is the preparation of a foamed thermoplastic resin having a plurality of inter-connection foam elements and provided with a plurality of individual strands of the foamed resin in the interstices of said passages.

In operating the process of the invention, it will often be found that good results are obtained if the pressure within the die is sufficient substantially to prevent the resin in the slits foaming before it leaves the slits, and if the relationship between the dimensions of the channels and the dimensions of the slits is such that the streams of resin issuing from the channels spread out to fill the slits and to coalesce whilst still in the unfoamed state.

For the production of a uniform and regular board it is normally preferable to employ a die which has slits arranged in a symmetrical network of meshes, backed up by a uniformly arranged series of channels, and with each mesh having its own substantially centrally located passage. It is often preferred that the network is composed of square meshes although the network may be composed of meshes of other shapes, such as those illustrated in Serial No. 532,308 for example. Dies of the preferred types are very suitable for the production of foamed polystyrene board.

The channels in the die are preferably circular in cross-section, and their other dimension is that along the direction of the flow of the resin, which is the "land" of the channels. However, the channels need not necessarily be circular in cross-section, and they can for instance be of some shape that is substantially circular and that can be said to possess a diameter, for example hexagonal or even perhaps square. Preferably, the channels as well as being of circular cross-section are arranged symmetrically behind the network of slits.

As mentioned above, the relationship between the dimensions of the channels and the dimensions of the slits is preferably such that the streams of resin issuing from the channels spread out to fill the slits and to coalesce whilst still in the unfoamed state. For example, in order to assist in ensuring coalescence before foaming, both the resistance to flow offered by the slits and the residence time of the foamable resin within them are preferably relatively high, and although these quantities are determined partly by the rheological properties of the foamable resin they are best controlled by means of a suitable choice of dimensions of the slit and of the channels.

The dimensions of the slits are measured in terms of the land, which as stated above is the measurement along the direction of the resin flow, and the cross-section, which is made up of the width and the length, the length being the larger of these two linear dimensions. In general the width of the slits is less than the diameter of channels positioned behind it; for instance the diameter of the channels is often from 1.3 to 10 times, especially from 1.3 to 5 times, the width of the slits. In general the network of slits is made up of a number of straight slits which are intercrossing, and the overall shape of the network corresponds to the cross-sectional shape of the extruded product. Preferably a number of straight slits are arranged so that a series of them are parallel to one another with another parallel series crossing them to form a network, each slit having its associated row of channels. A network of slits can also for example be in the form of a rectangular or triangular grid, for example a series of squares or a six-pointed star within a hexagon. The length of the network (viewed from the outlet end of the die) can be as much as desired, for instance from a few inches to 60 inches or even more, depending on the dimensions desired in the final extruded foamed resin. The width of each slit also bears some relationship to the thickness of the extruded resin, but is also to some extent dictated by the maximum practical extrusion rate and the degree of coalescence that can be achieved between the streams of unfoamed resin issuing from the channels. In general a width of slit between 0.01 and 0.25 inch, for instance from 0.02 to 0.1 inch and especially about 0.035 inch, has been found suitable. The land of the slits can for instance be between 0.05 inch and 2 inches, especially between 0.1 and 0.5 inch.

Preferably, the land of the channels is between ½ and 20 times the land of the slits, and for example where polystyrene is to be extruded the land of the channels can for instance be from 1.6 to 3 times the land of the slits. Where polyethylene is to be extruded the land of the channels can for instance be from 2 to 6 times the land of the slits. For other resins the ratio can be more or less than these values, depending on whether the viscoelastic memory of the resin is low or high, so as to minimize memory effects and give good coalescence between the streams of resin issuing from the channels.

The passages within the meshes of the network of slits can have a cross-section that is similar to the shape of the meshes which surround them, but they need not be identical. For instance a square mesh can have a passage that has a cross-section that is square, circular, or polygonal; a triangular or rectangular network can have passages whose cross-sections are respectively a triangle and a rectangle. Moreover, the cross-section need not be the same along the entire length of the passage, for example the passage can have a restricted cross-section at its outlet end or the cross-section can be circular over most of its length with only its outlet end of similar shape to the mesh it occupies. There can be more than one passage, for example two or three passages, within each mesh if desired. Also, although again as stated it is preferred that every mesh in a network has its accompanying passage it is possible for a certain distribution of the meshes to contain no passages.

Preferably the passages pass straight through the die from the front to the back of the die, so that they are fed with foamable resin from the screw of the extruder. In practice the cross-sectional area of a passage is preferably not more than 0.2 square inch, so that the pressure in the extruder is not reduced too much. For example the diameter of the passages can be between 0.02 and 0.1 inch, such as between 0.03 and 0.07 inch, for instance about 0.05 inch. The foaming resin issuing from the passages and from the network of slits expands in the atmosphere, and it is preferable for the size of the passages to be slightly greater than the dimensions that would just allow the foaming resin issuing from them to expand to fill the spaces formed by the foaming resin issuing from the slits. For example, the cross-sectional area of each passage is often conveniently such that from 15 to 40%, and preferably from 20 to 30%, of the total extruding polymer passes through the passages. Where there are several passages within each mesh, it is of course their combined cross-sectional area that needs to be considered.

The overall size of the die is governed by the cross-section of the foamed section that is to be produced by extrusion. In general, expansion takes place both along the width and the length of the die aperture (the network of slits), although the former expansion is the greater. For instance a board that is 1½ inches thick can be produced from a die that is relatively narrow in width, such as ½ inch.

An example of an extrusion die according to the invention is exemplified though not to scale, in the drawings accompanying the application, in which:

FIGURE 1 is a front elevation of the die; and

FIGURE 2 is a section along the line 11—11 in FIGURE 1.

In one embodiment, the die consists of a mild steel block 1 having extending into it from one side eighty-two cylindrical channels 2 as shown. The channels are arranged to communicate with a rectangular network of three horizontal and seventeen vertical intercommunicating slits, for example those designated 3, 4, 5 and 6. Each horizontal slit thus has sixteen channels associated with it and each vertical slit has two channels. There also are 32 cylindrical passages 7 extending completely through the block as shown, each passage being positioned centrally in one of the square meshes 8 of the network of slits. The die has means (not shown) for attaching it to the front of an extruder so that when the die is in use a foamable thermoplastic synthetic resin can be fed into it in the direction of the arrows in FIGURE 2.

By way of example, it can be indicated that the channels can for instance be 0.625 inch long with a diameter of 0.052 inch. The slits can conveniently be for example 0.035 inch wide and have a land of 0.375 inch, the three horizontal slits being each 4 inches long and spaced 0.25 inch apart, and the seventeen vertical slits being each 0.5 inch long and spaced 0.25 inch apart along the length of the horizontal slits. Each passage can for instance have a diameter of 0.052 inch.

In principle any of the above components can be different as to size or shape, and the above account is given by way of example only. The cross-section of the passages need not for example be circular, and it can be square, with a side of for instance 0.052 inch. Also, for example the network of slits need not be square as indicated.

In the process of the invention, the resin used is preferably a polymer or copolymer of a vinyl or vinylidene monomer, for example a hydrocarbon monomer such as for example ethylene, propylene, butadiene, styrene, vinyltoluene or α-methylstyrene, or a substituted monomer such as for example acrylonitrile, vinyl chloride, vinyl acetate, methyl acrylate, methyl methacrylate or ethyl acrylate. It is particularly preferred to employ a polyvinylaromatic resin, that is to say a polymer or copolymer of a vinylaromatic monomer, such as styrene, chlorostyrene, vinyltoluene or α-methylstyrene. A copolymer can be one of vinylaromatic monomer with another olefinic monomer, for example acrylonitrile, vinyl chloride, vinyl acetate, methyl acrylate, methacrylate or ethyl acrylate. Toughened polystyrene can be employed, for instance one that has been obtained by modification before or after polymerization with a natural or synthetic rubber. Excellent results have been obtained using polystyrene.

The resin used in the process is of course foamable and this means that it is in admixture with a blowing agent, which is preferably a volatile substance, for instance a volatile liquid. In many cases, the blowing agent is one that is a gas or vapour under normal atmospheric conditions (such as 20° C. and 1 atmosphere pressure), but which while under pressure before extrusion will be present in solution in the molten or semi-molten thermoplastic resin. Examples of volatile substances that can be used include lower aliphatic hydrocarbons such as ethane, ethylene, propane, propylene, isobutene, butadiene, butane, isoprene or pentane, lower alkyl halides such as methyl chloride, dichlorodifluoromethane, trichloromethane, or 1,2-dichlorotetrafluoroethane, and inorganic gases such as carbon dioxide or nitrogen. The lower aliphatic hydrocarbons, especially butane and isobutene, are preferred. The blowing agent can also be a chemical blowing agent, which can for example be a bicarbonate such as for example sodium bicarbonate or ammonium bicarbonate, or an organic nitrogen compound that yields nitrogen on heating, such as for example dinitrosopentamethylenediamine or barium azodicarboxylate. From 3 to 35% especially from 7 to 30%, by weight based on the weight of the resin is often a suitable proportion of blowing agent, and for example the use of from 7 to 15% by weight of butane or isobutene in conjunction with polystyrene has given excellent results. Sometimes the resin also contains a nucleating agent, which assists in the formation of a large number of fine cells. A wide range of nucleating agents can be employed, including finely-divided inert solids such as for example silica or alumina (perhaps used in conjunction with zinc stearate), or small quantities of a substance that decomposes at the extrusion temperature to give a gas can be used. An example of the latter class of nucleating agents is sodium bicarbonate, if desired in conjunction with a weak acid such as for example tartaric or citric acid. A small proportion of the nucleating agent, for example up to 5% by weight of the resin, is usually effective.

The blowing agent, especially where it is a volatile substance, is preferably mixed with the resin by injecting it into the barrel of the extruder used in the process; alternatively, a premixed composition containing the blowing agent, for example foamable polystyrene beads containing pentane, can be fed to the extruder.

The extrusion temperature (that is the temperature of the die and the resin within it) depends to some extent on the softening point of the resin, but in general temperatures between 95° C. and 180° C., preferably between 100° C. and 160° C., are suitable. For example, when foamable polystyrene is being extruded a temperature in the range 130° C. to 160° C. can be used, while for polyethylene somewhat lower temperatures, for instance 95° C. to 110° C. are often very suitable.

The pressure within the die is usually sufficient to prevent the resin foaming until it leaves the slits, and where the blowing agent is a condensable volatile substance the pressure is preferably greater than the saturated vapour pressure of the volatile substance at the extrusion temperature. Pressures for example greater than 250 pounds per square inch, and especially between 250 and 1500 pounds per square inch, can be employed. Preferably the pressure is between 300 and 1000 pounds per square inch.

It has been made clear that the process of the invention is of particular value in the production of extruded foamed material, such as for instance board, of a low density, such as from 0.9 to 1.5 pound per cubic foot, and possessing a substantial thickness, at least ¾ inch and for example up to 4 inches. However, a broader range of density can be produced, although there is often little advantage to be gained by increasing it above 2 or 3 pounds per cubic foot. A density close to 1 pound per cubic foot is usually preferable, for instance between 1 and 1.5 pounds, such as about 1.2 pound per cubic foot. The thickness too can be outside the above limits, for instance as low as ½ inch; a thickness of from 1 to 2½ inches, for instance in the region of 2 inches, is often very useful. Where the product is a board the width can be up to several feet, such as 2 feet or 4 feet, and the length can be course be as long as is desired. Foamed products apart from board are for instance those having a curved section, such as is required in for example ceiling covings or in pipe insulation.

As produced from the die the extruded resin such as for instance a board has substantially flat upper and lower surfaces. Sometimes there is a slightly ribbed structure to the surfaces, but not normally sufficient to prevent use of the extruded material for many purposes. In circumstances where a slightly uneven surface would otherwise be formed the extruded material can be passed through some means which lightly bear on the extruded surfaces and ensure that they are smooth. These means can for instance be a pair of rollers, moving belts, or forming lips attached to the front face of the die.

The detailed design of the die can be modified in many instances to assist in achieving an extruded material such as board having smooth surfaces. For example excellent results in this respect are obtained by ensuring that the land (measured from the front face of the die) of the slits round the periphery of the die is longer than the land of the slits which make up the inner meshes of the network. The land of the peripheral slits can for example be up to twice, for instance about 1½ times, as long as that of the other slits of the network.

In general the extruded foamed materials of the invention have an excellent "cross-breaking" strength as measured by the method described in British Standard Specification No. 3837, and it is for example not unusual to find that the strength along the extrusion direction is in the range of 18 to 30, such as from 22 to 28, pounds per square inch, and the strength across the extrusion direction is in the range of 25 to 40, such as from 28 to 32, pounds per square inch.

The process of the invention is illustrated by the following examples.

EXAMPLE 1

This example describes a process according to the invention for the production by extrusion of a relatively thick board of foamed polystyrene having a density of 1.2 pounds per cubic foot.

The die used was generally similar to that described above and illustrated in FIGURES 1 and 2, but it had three 1½-inch long horizontal slits and seven ½-inch long vertical slits, each slit being 0.035 inch wide and the slits defining a network of square "meshes" each mesh having ¼-inch long sides. The four slits defining the periphery of the network had a land of ½ inch, the land of the other slits being ¼ inch (both measured from the front face of the die). Each vertical slit had two cylindrical channels communicating with it while each horizontal slit had six, each channel being 0.052 inch in diameter. The land of the channels joined to the inner slits was ¾ inch and that of the channels communicating with the peripheral slits was ½ inch. In the centre of each "mesh" of the network was a passage of land 1 inch, passing right through the die and having a square cross-section of side 0.052 inch.

The die was fitted to an extruder having a barrel diameter of 1½ inches fitted with an adjustable pressure-reducing valve behind the die and means for injecting isobutene into the barrel. Polystyrene pellets in admixture with 0.5% by weight of finely-divided silica were then extruded through the die whilst injecting isobutene so as to produce a foamable composition containing 13% by weight of isobutene, the pressure within the extruder barrel being about 2,000 pounds per square inch and that immediately behind the die being about 600 pounds per square inch; the die temperature was 125° C. and foamed polystyrene issued from the die at a linear speed of about 10 feet per minute.

There was produced a well-consolidated board of foamed polystyrene having substantially flat surfaces; it was 3½ inches wide by 1¼ inches thick and had a density of 1.2 pounds per cubic foot.

It was found that the foamed polystyrene that had been extruded from the slits formed a coherent matrix within which were set the strands of foamed resin that had been extruded from the passages.

The surfaces of the extruded board were very slightly ribbed, and it was found that this could be corrected by passing the material after extrusion through a "shaping box" consisting of a pair of flat steel plates fitted to the front face of the die and extending outwards. The plates diverged away from each other, each being at an angle of 10° to the horizontal; they extended for 2 inches from the face of the die, and were maintained at a temperature of about 90° C.

The above example describes an experimental procedure only using a small die and extrusion apparatus. The production of wider boards is achieved by using a die in which the network of slits is appropriately extended in a sideways direction; similarly a thicker board can be produced by extending the network vertically.

The board (as produced by straight extrusion only) was tested for "cross-breaking" strength by a method similar to that described in British Standard Specification No 3837 except that by use of a suitably modified jig a sample 3 inches by 3 inches by 1 inch was employed. The strength along the extrusion direction was 25 pounds per square inch and that across the extrusion direction was 29 pounds per square inch.

EXAMPLE 2

This example describes a process according to the invention for the production of a foamed polystyrene board of greater width and thickness than that produced in Example 1.

The die used was generally similar to that described above and illustrated in FIGURES 1 and 2, but it had four 17-inch-long horizontal slits and sixty-nine ¾-inch-long vertical slits, each slit being 0.035 inch wide and the slits defining a network of square "meshes" each mesh having ¼-inch-long sides. The four slits defining the periphery of the network had a land of ½ inch, the land of the other slits being ⅜ inch (both measured from the front face of the die). Each vertical slit had three cylindrical channels communicating with it while each horizontal slit had sixty-eight, each channel being 0.052 inch in diameter. The land of the channel joined to the inner slits was ⅝ inch and that of the channels communicating with the peripheral slits was ½ inch. In the centre of each "mesh" of the network was a passage of land 1 inch, passing right through the die and having a circular cross-section of diameter 0.052 inch.

The die was fitted to an extruder having a barrel diameter of 2½ inches fitted with an adjustable pressure-reducing valve behind the die and means for injecting isobutene into the barrel. Polystyrene pellets in admixture with 0.25% by weight of finely-divided silica were then extruded through the die whilst injecting isobutene so as to produce a foamable composition within the extruder containing 14% by weight of isobutene. The pressure within the extruder barrel was about 3,500 pounds per square inch and that immediately behind the die was about 700 pounds per square inch; the die temperature was 120° C. and foamed polystyrene issued from the die at a linear speed of about 5.7 feet per minute, the throughput being 140 pounds per hour. The product was pulled off the die by means of a caterpillar take-off.

There was produced a well-consolidated board of foamed polystyrene having substantially flat surfaces; it was 26 inches wide and 1.62 inches thick and had a density of 1.4 pounds per cubic foot.

It was found that the foamed polystyrene that had been extruded from the slits formed a coherent matrix within which were set the strands of foamed resin that had been extruded from the passages. The product was of even density and cross-sectional appearance over almost its entire width, and although its surfaces were slightly ribbed it was found that this could be corrected by the use of a shaping box. A very smooth flat surface was produced on each major face of the extruded board.

The board (as produced using the shaping box) was tested for "cross-breaking" strength by the method described in Example 1 but using a standard-size specimen 8 inches by 2 inches by 1.62 inches thick. The strength along the extrusion direction was 18 pounds per square inch and that across the extrusion direction was 38 pounds per square inch, which is a very good result.

What is claimed is:

1. An extruded foamed thermoplastic resin board having a cross-section at right angles to its length consisting of a network of the extruded foamed material having enclosed within each of the meshes of the network a strand of the extruded foamed material, such that the board as a whole has a substantially uniform cross-section.

2. A board of foamed thermoplastic resin as defined in claim 1 wherein the board as a whole has a thickness of at least three-quarters of an inch and a density of from 0.9 to 2 pounds per cubic foot and upper and lower faces which are substantially flat.

3. A board of foamed thermoplastic resin as defined in claim 1 wherein the board as a whole has a thickness of at least three-quarters of an inch and a density of from 0.9 to 1.5 pounds per cubic foot and upper and lower faces which are substantially flat.

4. A foamed thermoplastic resinous board as defined in claim 1 wherein the resin is polystyrene.

5. A foamed thermoplastic resinous board as defined in claim 1 wherein the resin is a polyolefin.

6. A foamed thermoplastic resin board as defined in claim 1 wherein the resin is polyvinyl chloride.

7. A process for the production of a foamed thermoplastic synthetic resin, which comprises extruding a foamable thermoplastic synthetic resin through a die having at its inlet end a plurality of channels communicating with slits arranged to form the meshes of a network as viewed from the outlet end of the die, the majority of the meshes each having a substantially central passage leading back from the front face of the die to the inlet end of the die and not communicating directly with the slits, such that a strand of foamed resin is extruded from each passage and is enveloped by foamed resin issuing from the slits of the network.

8. A process according to claim 7 in which the pressure within the die is sufficient substantially to prevent the resin in the slits foaming before it leaves the slits and the relationship between the dimensions of the channels and the dimensions of the slits is such that the streams of resin issuing from the channels spread out to fill the slits and to coalesce whilst still in the unfoamed state.

9. A process according to claim 7 wherein the foamed thermoplastic synthetic is foamed polystyrene.

10. An extrusion die suitable for use in the extrusion of a foamed thermoplastic resin, which comprises at its inlet end a plurality of channels communicating with slits arranged to form the meshes of a network as viewed from the outlet end of the die, the majority of the meshes each having a substantially central passage leading back from the front face of the die to the inlet end of the die and not communicating directly with the slits.

11. An extrusion die as set forth in claim 10 wherein the meshes of the network formed by the slits are essentially square.

12. An extrusion die as set forth in claim 10 wherein the meshes of the network are essentially triangular in shape.

13. An extrusion die as set forth in claim 10 wherein the width of the slits is less than the diameter of the channels.

14. An extrusion die as set forth in claim 10 wherein the diameter of the channels is from 1.3 to 10 times the width of the slits.

15. An extrusion die as set forth in claim 10 wherein the diameter of the channels is from 1.3 to 5 times the width of the slits.

References Cited

UNITED STATES PATENTS

| 2,734,224 | 2/1956 | Winstead. | |
|---|---|---|---|
| 2,748,401 | 6/1956 | Winstead. | |
| 2,927,876 | 3/1960 | Hoppe et al. | 264—46 XR |
| 2,945,261 | 7/1960 | Aykanian et al. | 264—53 |
| 3,121,130 | 2/1964 | Wiley et al. | 264—53 |
| 3,212,134 | 10/1965 | Yokana. | |
| 3,229,005 | 1/1966 | Reifenhauser. | |
| 3,270,393 | 9/1966 | Levenson | 264—47 XR |
| 3,406,230 | 10/1968 | Baxter et al. | 264—51 |

FOREIGN PATENTS 568,559   1/1959   Canada.

PHILIP E. ANDERSON, Primary Examiner

U.S. Cl. X.R.

18—12; 25—17; 161—159; 264—46, 53, 54, 177